(12) United States Patent
Nagahisa

(10) Patent No.: US 9,880,058 B2
(45) Date of Patent: Jan. 30, 2018

(54) SEMICONDUCTOR INTEGRATED CIRCUIT

(71) Applicant: Takeshi Nagahisa, Osaka (JP)

(72) Inventor: Takeshi Nagahisa, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 571 days.

(21) Appl. No.: 14/557,554

(22) Filed: Dec. 2, 2014

(65) Prior Publication Data

US 2015/0168220 A1 Jun. 18, 2015

(30) Foreign Application Priority Data

Dec. 17, 2013 (JP) ................................ 2013-260560

(51) Int. Cl.
*G01J 5/00* (2006.01)
*G01K 1/02* (2006.01)
(Continued)

(52) U.S. Cl.
CPC ............... *G01J 5/10* (2013.01); *G01J 5/0022* (2013.01); *G01J 5/0025* (2013.01); *G01J 5/06* (2013.01);
(Continued)

(58) Field of Classification Search
CPC ........ G01J 5/00; G01J 2005/0048; G01J 5/10; G01K 15/00; G01K 7/01; G01K 1/02;
(Continued)

(56) References Cited

U.S. PATENT DOCUMENTS 5,017,018 A 5/1991 Iuchi et al.
6,283,629 B1 * 9/2001 Kraus ..................... G01J 5/522
250/252.1
(Continued)

FOREIGN PATENT DOCUMENTS

EP 1055391 A1 11/2000
EP 1061348 A2 12/2000
(Continued)

OTHER PUBLICATIONS

May 15, 2015 European Search Report in corresponding European Patent Application No. EP 14 19 7447.

*Primary Examiner* — Gail Kaplan Verbitsky
(74) *Attorney, Agent, or Firm* — Cooper & Dunham LLP

(57) ABSTRACT

A semiconductor integrated circuit includes an acquisition unit configured to acquire a value outputted from an infrared sensor in response to an infrared ray received from an object, and a value outputted from a temperature sensor as a function of measured temperature of the infrared sensor; a second-temperature identification circuit configured to identify a second temperature which is a temperature of the object when the temperature of the infrared sensor corresponding to a measured value which is the output value of the infrared sensor, is the first temperature, by referring to the correspondence; a third-temperature identification circuit configured to identify a third temperature which is the temperature of the infrared sensor in outputting the measured value; and a calculation circuit configured to calculate a fourth temperature which is a temperature of the object on the basis of the first temperature, the second temperature, and the third temperature.

20 Claims, 28 Drawing Sheets

(51) Int. Cl.
*G01J 5/10* (2006.01)
*G01J 5/06* (2006.01)

(52) U.S. Cl.
CPC . *G01J 2005/0048* (2013.01); *G01J 2005/068* (2013.01)

(58) Field of Classification Search
CPC .......... G01K 2217/00; H01L 21/67248; G01N 2035/00326
USPC ...... 702/99, 136; 374/121, 134, 170, 178, 1, 374/2
See application file for complete search history.

(56) References Cited

U.S. PATENT DOCUMENTS

| | | | |
|---|---|---|---|
| 6,572,264 B1 | 6/2003 | Egawa | |
| 6,609,824 B1* | 8/2003 | Sato | G01J 5/026 374/132 |
| 7,407,323 B2* | 8/2008 | Hutcherson | G01J 5/16 374/1 |
| 8,569,684 B2* | 10/2013 | Olson | H01L 27/14649 250/252.1 |
| 9,723,229 B2* | 8/2017 | Nguyen | G01J 5/02 |
| 9,759,613 B2* | 9/2017 | Kimura | G01J 5/02 |
| 2002/0074499 A1* | 6/2002 | Butler | G01J 5/10 250/338.1 |
| 2005/0094705 A1 | 5/2005 | Chi | |
| 2009/0010301 A1 | 1/2009 | Nagahisa | |
| 2011/0228811 A1* | 9/2011 | Fraden | G01J 5/061 374/130 |
| 2013/0284931 A1 | 10/2013 | Nagahisa et al. | |
| 2014/0077872 A1 | 3/2014 | Nagahisa | |
| 2014/0312967 A1 | 10/2014 | Nagahisa | |

FOREIGN PATENT DOCUMENTS

| | | |
|---|---|---|
| EP | 1530034 A1 | 5/2005 |
| JP | 62297725 A * | 12/1987 |
| JP | 2003-042849 | 2/2003 |
| JP | 2012-230077 | 11/2012 |

* cited by examiner

TEMPERATURE SENSOR OUTPUT VALUE
VT

INFRARED SENSOR
TEMPERATURE TS

AD-CONVERTED VALUE
OF TEMPERATURE SENSOR OUTPUT
DT

INFRARED SENSOR
TEMPERATURE TS

FIG.9

```
         PROCESS A
             │              ___ S6
             ▼
   CREATE FIRST BASE          S61
      TABLE 201
             │
             ▼
  CREATE FIRST INTERPOLATION   S62
        TABLE 301
             │
             ▼
   STORE FIRST INTERPOLATION   S63
  TABLE 301 IN STORAGE UNIT 17
             │
             ▼
           END
```

| OBJECT TEMPERATURE TA | INFRARED SENSOR TEMPERATURE TS | AD-CONVERTED VALUE OF TEMPERATURE SENSOR OUTPUT DT | AD-CONVERTED VALUE OF INFRARED SENSOR OUTPUT DS |
|---|---|---|---|
| TA1 | T1 | DT1 | DS1 |
| TA2 | T1 | DT1 | DS2 |
| TA3 | T1 | DT1 | DS3 |

| k1 | TA | DS |
|---|---|---|
| 0 | 233 | 0 |
| 1 | 252 | 32 |
| 2 | 281 | 64 |
| ⋮ | ⋮ | ⋮ |
| n1−3 | 505 | 928 |
| n1−2 | 509 | 960 |
| n1−1 | 513 | 992 |
| n1 | 517 | 1023 |

301

| OBJECT TEMPERATURE TA | INFRARED SENSOR TEMPERATURE TS | AD-CONVERTED VALUE OF TEMPERATURE SENSOR OUTPUT DT | AD-CONVERTED VALUE OF INFRARED SENSOR OUTPUT DS |
|---|---|---|---|
| TA1 | TA1 | DT1 | DS1 |
| TA2 | TA2 | DT2 | DS1 |

| k2 | TS | DT |
|---|---|---|
| 0 | 242 | 1024 |
| 1 | 265 | 896 |
| 2 | 288 | 768 |
| ⋮ | ⋮ | ⋮ |
| n2-2 | 380 | 256 |
| n2-1 | 403 | 128 |
| n2 | 426 | 0 |

302

SEMICONDUCTOR INTEGRATED CIRCUIT

CROSS-REFERENCE TO RELATED APPLICATION

The present application is based on and claims priority from Japanese Patent Application Number 2013-260560, filed on Dec. 17, 2013, the disclosure of which is hereby incorporated by reference herein in its entirety.

BACKGROUND OF THE INVENTION

1. Field of the Invention

The present invention relates to a semiconductor integrated circuit.

2. Description of the Related Art

A technique of activating an instrument only when a human body is present near the instrument by mounting a sensor for detecting the presence of the human body in the instrument has been known in view of energy saving. Examples of the sensor mounted in the instrument include techniques of infrared sensors that quantitate the amount of energy emitted from the human body and entering the sensor, and detect the temperature of the human body. The instrument used herein is, for example, electric appliances and office machines.

The types of infrared sensors include a thermal infrared sensor, a quantum infrared sensor, and the like. The thermal infrared sensor converts infrared energy into thermal energy on an absorption face of the sensor, and detects a change in temperature as an electric signal. An output value VS of the thermal infrared sensor satisfies the following equation (1) in terms of the relation between an object temperature (for example, temperature of the human body) TA and a temperature TS of the infrared sensor. Here, U is a constant determined based on characteristics of the infrared sensor.

$$VS = U(TA^4 - TS^4) \quad (1)$$

As represented by the equation (1), to calculate the object temperature from the output value of the thermal infrared sensor, the temperature of the infrared sensor must be measured.

Thus, it is necessary to measure the temperature of the infrared sensor, and then to calculate the object temperature by using the output value of the infrared sensor and the measured temperature of the infrared sensor.

A temperature measuring device including an infrared sensor and a temperature measuring unit for measuring the temperature of the infrared sensor has heretofore been proposed (Refer to Japanese Unexamined Patent Application Publication No. 2012-78159, for example).

However, for the proposed temperature measuring device, calculating the object temperature requires solving a high-order polynomial expression having a large number of significant figures. For example, Japanese Unexamined Patent Application Publication No. 2012-78159 states that calculating the object temperature requires solving the following equation (2), where $T_{AMB}$ is an environmental temperature, and B is an offset correction value for correcting a measurement error of the environmental temperature.

$$B = (-7.6885 \times 10^{-6}) \times T_{AMB}^3 - (1.5578 \times 10^{-3}) \times T_{AMB}^2 - (6.8163 \times 10^{-2}) \times T_{AMB} + 3.7461 \quad (2)$$

However, solving such high-order polynomial expression having a large number of significant figures makes an arithmetic circuit complicated and larger in scale, increasing the area of an integrated circuit and in turn, manufacturing costs, for the calculation on the integrated circuit.

SUMMARY OF THE INVENTION

An object of the present invention is to provide a semiconductor integrated circuit that can easily calculate an object temperature by using an output value of an infrared sensor and the temperature of the infrared sensor.

A semiconductor integrated circuit according to the present invention includes an acquisition unit configured to acquire an output value outputted from an infrared sensor in response to an infrared ray received from an object, and an output value outputted from a temperature sensor as a function of measured temperature of the infrared sensor; a storage unit configured to store correspondence among a first temperature which is a reference temperature, a temperature of the object at the time when the temperature of the infrared sensor is the first temperature, and the output value of the infrared sensor; a second-temperature identification circuit configured to identify a second temperature which is a temperature of the object at the time when the temperature of the infrared sensor corresponding to a measured value which is the output value of the infrared sensor, which is acquired by the acquisition unit, is the first temperature, by referring to the correspondence; a third-temperature identification circuit configured to identify a third temperature which is the temperature of the infrared sensor at the time when the infrared sensor outputs the measured value; and a calculation circuit configured to calculate a fourth temperature which is a temperature of the object on the basis of the first temperature, the second temperature, and the third temperature.

According to the present invention, the temperature of the object can be easily calculated by using the output value of the infrared sensor and the temperature of the infrared sensor.

BRIEF DESCRIPTION OF THE DRAWINGS

FIG. 5A is a block diagram, FIG. 5B is a graph illustrating relationship between the object temperature and the input value to the AD converter, FIG. 5C is a graph illustrating relationship between the input voltage to the AD converter and the output value of the AD converter, and FIG. 5D is a graph illustrating relationship between the object temperature and the output value of the AD converter;

FIG. 6A is a block diagram, FIG. 6B is a graph illustrating relationship between the temperature of the infrared sensor and the input value to the AD converter, and FIG. 6C is a graph illustrating relationship between the temperature of the infrared sensor and the output value of the AD converter;

FIG. 9 is a flowchart illustrating a flow of a process A included in the preparation flow;

FIG. 10 is a schematic view illustrating an example of information in a first base table created through the flow of the process A;

FIG. 37A is the graph illustrating relationship between the temperature of the infrared sensor and the correction value, and FIG. 37B is the graph illustrating relationship between the temperature of the infrared sensor and the correction value in the third interpolation table.

DETAILED DESCRIPTION OF THE PREFERRED EMBODIMENTS

A semiconductor integrated circuit according to the present invention (hereinafter referred to as "the circuit") will be described below with reference to figures.

A case of calculating the temperature of the human body located at a certain distance from the circuit will be described. That is, the human body is an example of an object. The certain distance refers to a distance to be detected by the circuit. In following description, the certain distance is a unique value determined according to characteristics of the infrared sensor.

Semiconductor Integrated Circuit (1)

Figure 1:
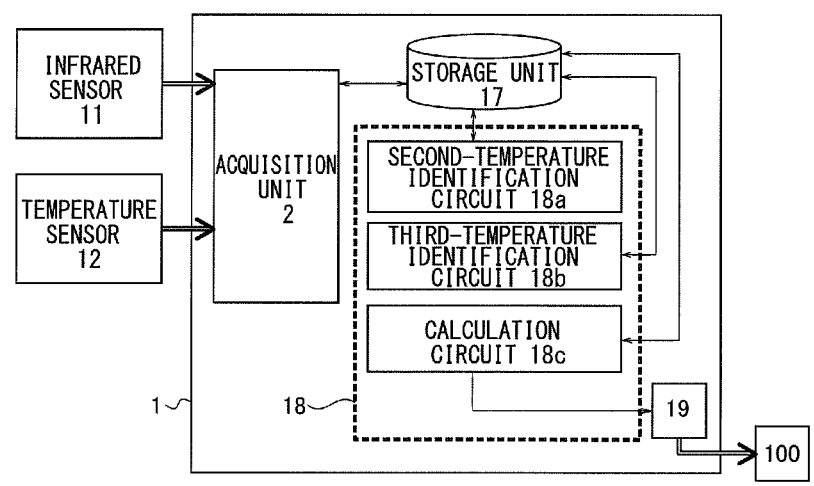
FIG. 1 is a functional block diagram illustrating an embodiment of a semiconductor integrated circuit according to the present invention.

FIG. 1 is a functional block diagram illustrating an embodiment of the semiconductor integrated circuit according to the present invention.

The circuit 1 includes an acquisition unit 2, a storage unit 17, a calculation unit 18, and an interface unit 19.

Acquisition Unit

The acquisition unit 2 is formed of an AD converter, for example. The acquisition unit 2 acquires an output value (hereinafter, also referred to as "VS") of the infrared sensor 11 and an output value (hereinafter, also referred to as "VT") of a temperature sensor 12. The acquisition unit 2 AD-converts the acquired output value, and acquires an AD-converted output value (hereinafter, also referred to as "DS") of the infrared sensor 11 and an AD-converted output value (hereinafter, also referred to as DT") of the temperature sensor 12. The acquisition unit 2 stores DS and DT in the storage unit 17.

Infrared Sensor

The infrared sensor 11 receives an infrared ray from the object, and converts it into an electric signal. The infrared sensor 11 is, for example, a thermal infrared sensor. The infrared sensor 11 converts the amount of received infrared ray into a heat amount, and sends an output value, corresponding to the converted heat amount, that is, VS to the acquisition unit 2.

Temperature Sensor

The temperature sensor 12 measures the temperature of the infrared sensor 11, and the measured temperature into an electric signal. The temperature sensor 12 is, for example, a temperature-voltage conversion circuit having a thermistor. The temperature sensor 12 sends the output value from the temperature sensor 12, that is, VT to the acquisition unit 2.

Storage Unit

The storage unit 17 stores various types of information used in a below-mentioned flow performed by the circuit 1. The storage unit 17 stores DS and DT sent from the acquisition unit 2. The storage unit 17 also stores a below-mentioned first temperature (hereinafter, also referred to as "T1").

The storage unit 17 stores a first correspondence and a second correspondence.

Here, the first correspondence is information (table) indicating the correspondence between the temperature of the object and the AD-converted output value of the infrared sensor. The second correspondence is information (table) indicating the correspondence between the temperature of the infrared sensor 11 and the AD-converted output value of the temperature sensor 12.

Calculation Unit

The calculation unit 18 has a second-temperature identification circuit 18a, a third-temperature identification circuit 18b, and a calculation circuit 18c.

The second-temperature identification circuit 18a reads DS stored in the storage unit 17, and executes a below-mentioned process Q to calculate a below-mentioned second temperature (hereinafter, also referred to as "T2").

The third-temperature identification circuit 18b reads DT stored in the storage unit 17, and executes a below-mentioned process P to calculate a below-mentioned third temperature (hereinafter, also referred to as "T3").

The calculation circuit 18c reads T1, T2, and T3, which are stored in the storage unit 17, and executes a below-mentioned process R to calculate a below-mentioned fourth temperature (hereinafter, also referred to as "T4").

Interface Unit

The interface unit 19 outputs T4 calculated by the calculation unit 18, which is the object temperature (hereinafter, also referred to as "TA"), to an external apparatus 100. The circuit 1 can be connected to the external apparatus 100 via the interface unit 19.

Structures of the Circuit

Figure 2:
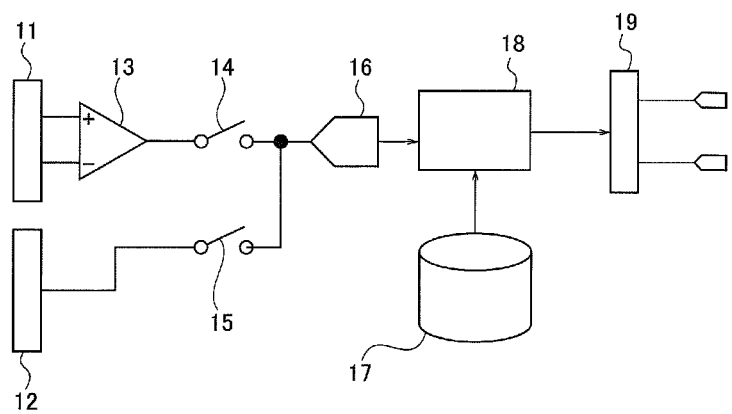
FIG. 2 is a block diagram illustrating the embodiment of the semiconductor integrated circuit.

FIG. 2 is a block diagram illustrating the embodiment of the circuit. Structures that are not shown in the functional block diagram will be described below.

Amplifier

An amplifier 13 amplifies a differential signal outputted from the infrared sensor 11 to a single signal. The amplifier 13 is connected to the infrared sensor 11 and a switch 14.

Switches

The switch 14 (hereinafter, also referred to as "SW1") and a switch 15 (hereinafter, also referred to as "SW2") controls which of VS and VT is inputted to an AD converter 16. A timing at which SW1 and SW2 are opened or closed is controlled using a controller not shown, which is connected to SW1 and SW2. The controller sends an open/close command to SW1 and SW2 in response to a clock signal from a clock generation circuit not shown.

AD Converter

The AD converter 16 corresponds to the acquisition unit 2 in the functional block diagram of FIG. 1. That is, the AD converter 16 AD-converts VS into DS, and AD-converts VT into DT. The AD converter 16 stores DS and DT in the storage unit 17 via the calculation unit 18.

Figure 3:
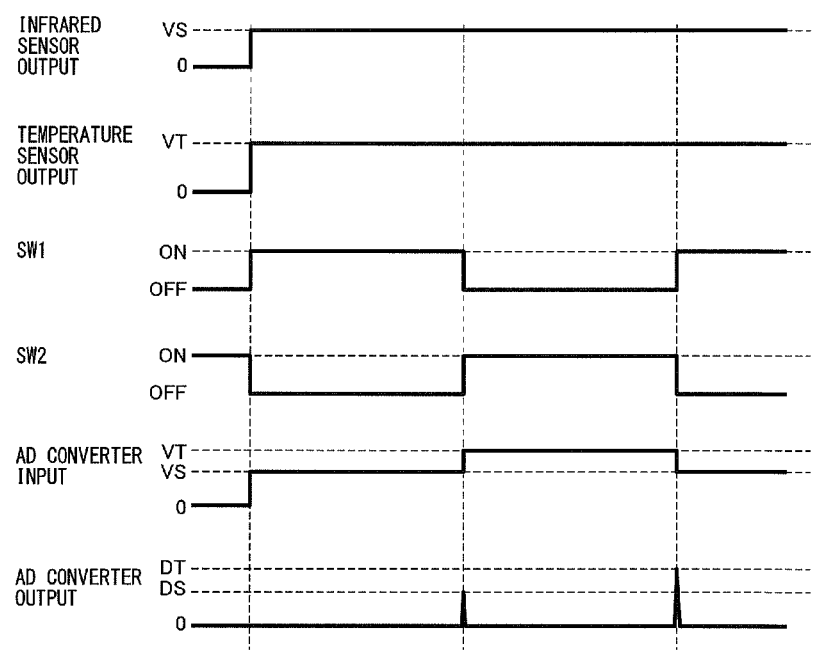
FIG. 3 is a timing chart illustrating input/output timings of the output value of a temperature sensor, the output value of an infrared sensor, and the input value and the output value of the AD converter, which are acquired in the semiconductor integrated circuit.

FIG. 3 is a timing chart illustrating input/output timings of the output value of the temperature sensor 12, the output value of the infrared sensor 11, and the input value and the output value of the AD converter 16, which are acquired in the circuit.

Here, the temperature sensor 12 outputs VT. The infrared sensor 11 outputs VS. The conduction state of SW1 is inconsistent with the conduction state of SW2. That is, while SW1 is conducting, SW2 is not conducting. While SW1 is not conducting, SW2 is conducting.

When SW1 is conducting, the AD converter 16 is electrically connected to the amplifier 13 connected to the infrared sensor 11. Consequently, the output value VS of the infrared sensor 11 is inputted to the AD converter 16. In FIG. 3, the amplification factor of the amplifier 13 is 1.

When VS is inputted to the AD converter 16, VS is AD-converted and the AD converter 16 outputs DS. Upon outputting of DS, SW1 becomes nonconductive, and SW2 becomes conductive.

When SW2 is conducting, the AD converter 16 is electrically connected to the temperature sensor 12. The output value VT of the temperature sensor 12 is inputted to the AD converter 16.

When VT is inputted to the AD converter 16, VT is AD-converted and the AD converter 16 outputs DT. Upon outputting of DT, SW2 becomes nonconductive, and SW1 becomes conductive.

Structure of the Circuit

Figure 4:
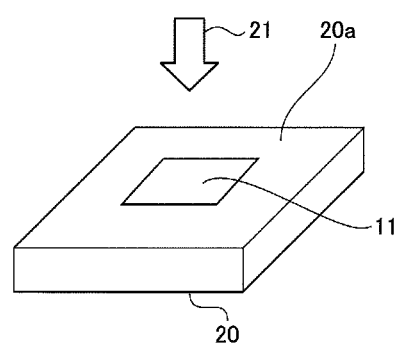
FIG. 4 is a schematic view illustrating an example of the structure of the semiconductor integrated circuit.

FIG. 4 is a schematic view illustrating an example of the structure of the circuit. In FIG. 4, the circuit 1 not shown, the infrared sensor 11, and the temperature sensor 12 not shown are integrally formed on an upper face 20a of a silicon substrate 20. In particular, the infrared sensor 11 is disposed at the center of the upper face 20a of the silicon substrate 20, and the circuit and the temperature sensor 12 not shown are disposed around the infrared sensor 11. The infrared sensor 11 receives an infrared ray 21 applied to the upper face 20a of the silicon substrate 20.

Output of AD Converter from Infrared Sensor

Next, the correspondence between the input value from the infrared sensor 11 to the AD converter 16 and the output value of the AD converter 16 will be described.

FIG. 5A to FIG. 5D are schematic view illustrating an example of the input value from the infrared sensor 11 to the AD converter 16 and the output value of the AD converter 16.

Figure 5A:
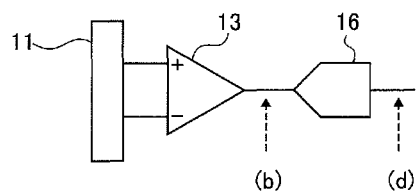
FIG. 5A to FIG. 5D illustrate an example of the value inputted from the infrared sensor to the AD converter and the output value of the AD converter.

FIG. 5A is a block diagram illustrating connection between the infrared sensor 11 and the AD converter 16 in the conductive state of SW1. In a section indicated by an arrow (b) in FIG. 5A, relationship represented by a graph of FIG. 5B can be achieved and in a section indicated by an arrow (d) in FIG. 5A, and relationship represented by a graph of FIG. 5D can be achieved.

Figure 5B:
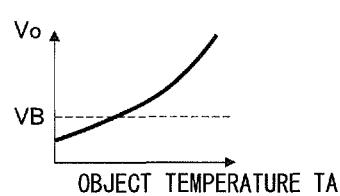

FIG. 5B is a graph illustrating relationship between TA and an output voltage of the amplifier 13 (hereinafter, also referred to as "Vo").

The object temperature TA is the temperature of the object calculated by the circuit 1 on the basis of the amount of the infrared ray emitted from the object.

Here, relationship between TA and Vo is expressed by the following equation (3), where U is a constant determined on the basis of characteristics of the infrared sensor 11, A is the amplification factor of the amplifier 13, and VB is a unique constant determined on the basis of characteristics of the amplifier 13.

$$Vo=AU(TA^4-TS^4)+VB \qquad (3)$$

Figure 5C:
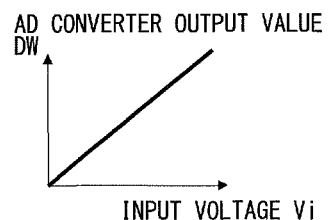

FIG. 5C is a graph illustrating relationship between the input voltage to the AD converter 16 (hereinafter, also referred to as "Vi") of the circuit 1 and the output value of the AD converter 16 (hereinafter, also referred to as "DW") of the circuit 1. Here, the relationship between Vi and DW is expressed by the following equation (4), where B is a unique constant determined on the basis of characteristics of the AD converter 16.

$$DW=BVi \qquad (4)$$

The input voltage Vi to the AD converter 16 is the voltage inputted to the AD converter 16. The voltage inputted to the AD converter 16 is a signal acquired by amplifying the output value of the infrared sensor 11 by the amplifier 13 when SW1 is conducting.

The AD converter output DW is the output value of the AD converter 16. When SW1 is conducting, DW is equal to DS.

Figure 5D:
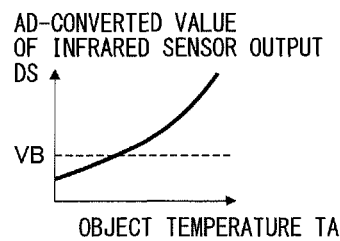

FIG. 5D is a schematic view illustrating relationship between TA and DS. Since Vi is equal to Vo in the equations (3) and (4), and DW is equal to DS when SW1 is conducting, the graph of FIG. 5D is expressed by the following equation (5).

$$DS=BAU(TA^4-TS^4)+B \cdot VB \qquad (5)$$

Output of AD Converter from Temperature Sensor

Figure 6A:
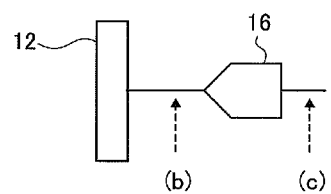
FIG. 6A to FIG. 6C illustrate an example of the value inputted from the temperature sensor to the AD converter and the output value of the AD converter.
Figure 6B:
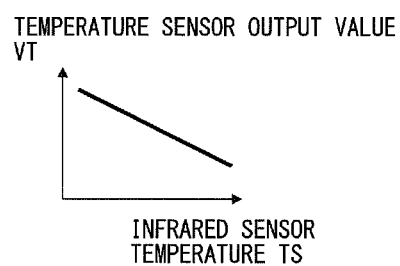
Figure 6C:
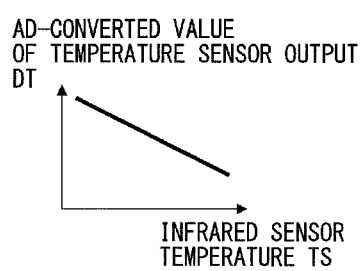

FIG. 6A to FIG. 6C are schematic views illustrating an example of the input value from the temperature sensor 12 to the AD converter 16 and the output value of the AD converter 16 in the conductive state of SW2.

FIG. 6A is a block diagram illustrating connection between the temperature sensor 12 and the AD converter 16. In a section indicated by an arrow (b) in FIG. 6A, relationship represented by a graph of FIG. 6B can be achieved, and in a section indicated by an arrow (c) in FIG. 6A, relationship represented by a graph of FIG. 6C can be achieved.

FIG. 6B is a graph illustrating relationship between the temperature of the infrared sensor (hereinafter, also referred to as "TS") and the output of the temperature sensor 12 (hereinafter, also referred to as "VT"). Here, the temperature sensor 12 having linear output characteristics with respect to TS is used.

FIG. 6C is a schematic view illustrating relationship between TS and DT in the circuit 1. The relationship between TS and DT is expressed by the following equation (6), where Ca is a constant determined on the basis of characteristics of the temperature sensor 12, and Cb is a constant determined on the basis of characteristics of the AD converter 16.

$$DT=Ca \cdot TS+Cb \qquad (6)$$

Relationship Between AD-Converted Output Value of Infrared Sensor and Object Temperature Next, relationship between an AD-converted output value of the infrared sensor and the object temperature will be described.

Figure 7:
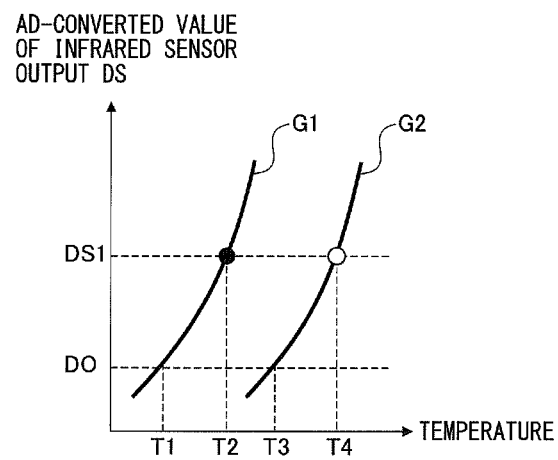
FIG. 7 is a graph illustrating relationship between each of a first temperature, a second temperature, a third temperature, and a fourth temperature, and the output value of the AD converter in response to the input from the infrared sensor.

FIG. 7 is a graph illustrating relationship between each of T1, T2, T3, and T4, and the output value DS of the AD converter 16 with respect to the input from the infrared sensor 11.

T1 is a temperature at which TS becomes DO. T1 is a value determined on the basis of characteristics of the infrared sensor 11.

T2 is TA at the temperature of the infrared sensor 11 of T1.

T3 is a temperature of the infrared sensor 11, which is calculated from a measured value of the temperature sensor 12.

T4 is TA at the temperature of the infrared sensor 11 of T3.

G1 is a graph illustrating the relationship between TA and DS when the temperature TS of the infrared sensor 11 is T1.

G2 is a graph illustrating the relationship between TA and DS when the temperature TS of the infrared sensor 11 is T3.

DO is a reference value of the infrared sensor 11. That is, DO is DS in the case of TA=TS.

DS1 is a measured value of the infrared sensor 11.

Method of Calculating Fourth Temperature

Next, a method of calculating T4 using T1, T2, and T3 will be described.

T1 and T2 satisfy the following equation (7) according to the equation (5).

$$DS1=BAU(T2^4-T1^4)+B \cdot VB \qquad (7)$$

Similarly, T3 and T4 satisfy the following equation (8) according to the equation (5).

$$DS1=BAU(T4^4-T3^4)+B \cdot VB \qquad (8)$$

The following equation (9) is derived from the equation (7) and the equation (8).

$$T4 = \sqrt[4]{T2^4 - T1^4 + T3^4} \qquad (9)$$

In this manner, T4 is calculated using T1, T2, and T3. Since T4 can be found according to the equation (9), the calculation circuit 18c can calculate T4 by using an adder, a subtracter, a square root extractor, and a comparator.

Measurement Flow and Preparation Flow

Next, flows (information processing) performed by the circuit 1 will be described. The circuit 1 performs a measurement flow for measuring (calculating) T4 and a preparation flow for creating base tables and interpolation tables, which are used in the measurement flow.

Figure 8:
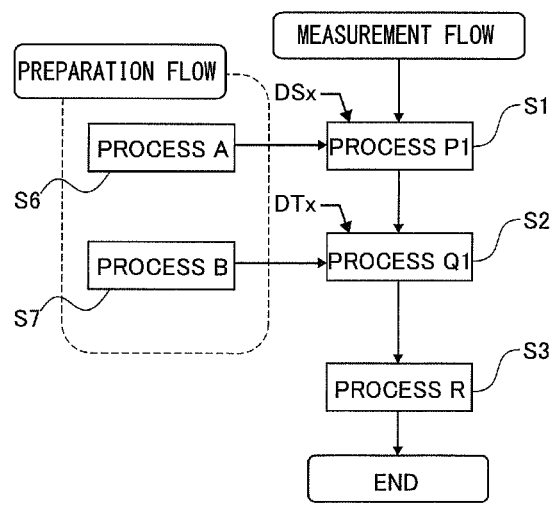
FIG. 8 is a schematic view illustrating correspondence between a measurement flow and a preparation flow that are performed by the semiconductor integrated circuit.

FIG. 8 is a schematic view illustrating an example of the flows performed by the circuit 1. The preparation flow includes a process A (step S6) and a process B (S7). The measurement flow includes a process P1 (S1), a process Q1 (S2), and a process R (S3). The process A is a flow for creating a first interpolation table 301 used in the process P1. The process B is a flow for creating a second interpolation table 302 used in the process Q1.

Method of Generating First Correspondence

Next, a method of generating the first correspondence will be described.

As described above, the first correspondence is information (table) indicating correspondence between TA and DS. Specific contents of the first correspondence are a below-mentioned first base table 201 and the first interpolation table 301. The first correspondence is generated by a generation circuit not shown of the circuit 1. The first base table 201 and the first interpolation table 301 are generated through the process A. The process A is performed before start of the measurement flow. The first base table 201 and the first interpolation table 301 are stored in the storage unit 17 before start of the measurement flow.

FIG. 9 is a schematic view of a procedure (process A) of the method of generating the first correspondence, which is performed by the circuit 1.

First, the circuit 1 creates the first base table 201 according to a below-mentioned predetermined method (S61).

Subsequently, the circuit 1 creates the first interpolation table 301 according to a below-mentioned predetermined method (S62).

Subsequently, the circuit 1 stores the first interpolation table 301 in the storage unit 17 (S63).

First Base Table

Next, the first base table 201 will be described.

The first base table 201 is a table indicating the relationship between TA and DS, which is created by the calculation unit 18 in S61 of the process A. The first base table 201 stores a plurality of data sets, in which TA, TS, DT, and DS are associated with one another.

FIG. 10 is a schematic view illustrating an example of information stored in the first base table 201. The calculation unit 18 receives DT and DS acquired when the value of TA in the case of TS of T1 is artificially changed to TA1, TA2, and TA3 from the temperature sensor 12 and the infrared sensor 11, respectively. The calculation unit 18 associates the acquired values DT (DT1, DT2, and DT3) and DS (DS1, DS2, and DS3) with TS, and stores the values in the first base table 201.

Here, TA1 may be set to be equal to T1. When TA1 is T1, no error in DT occurs due to a difference between TA1 and T1, realizing the first base table 201 having a small temperature-induced error of DT.

Figures 11, 12:
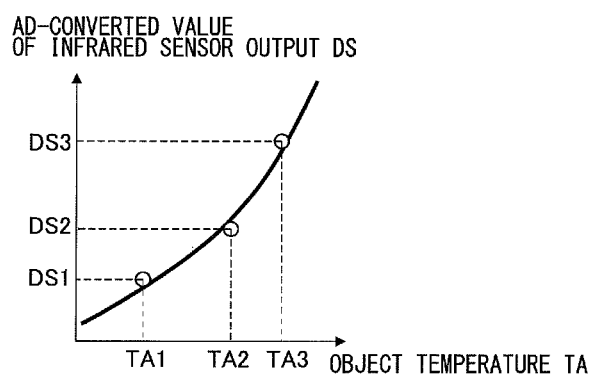
FIG. 11 is a graph illustrating relationship between the object temperature and the output value of the AD converter in response to the input from the infrared sensor, which are stored in the first base table.
FIG. 12 is a schematic view illustrating information in a first interpolation table created on the basis of the information stored in the first base table.
Figure 13:
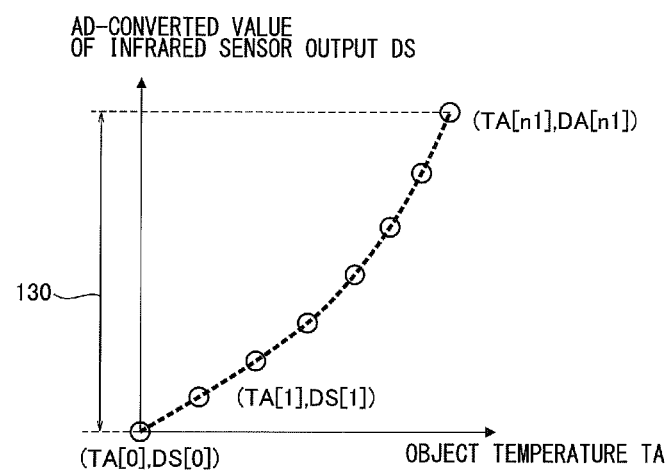
FIG. 13 is a graph illustrating relationship between the object temperature and the output value of the AD converter in response to the input from the infrared sensor, which are stored in the first interpolation table.

FIG. 11 is a graph illustrating the relationship between TA and DS, which is stored in the first base table 201. The relationship between TA and DS is represented by the curve shown in FIG. 5D. Here, since the three data sets are stored in the first base table 201, the number of points shown in FIG. 13 is three.

First Interpolation Table

Next, the first interpolation table 301 will be described.

The first interpolation table 301 is a table that stores a plurality of data sets in which TA is associated with DS. Information (relationship between TA and DS) stored in the first interpolation table 301 can be found by estimating correspondence between the TA and DS on the basis of values in the first base table 201, and performing predetermined calculations from the estimated correspondence.

FIG. 12 is a schematic view illustrating an example of information stored in the first interpolation table 301 created on the basis of the information stored in the first base table 201 in S62. The first interpolation table 301 stores column number k1, TA, and DS that are associated with one another. The number of data sets stored in the first interpolation table 301 is n1.

Here, a method of creating the first interpolation table 301 on the basis of the first base table 201 will be described.

First, an equation indicating the relationship between TA and DS is created based on the first base table 201. Here, the pair of TA and DS in the first base table 201 satisfy the equation (5). Accordingly, the calculation unit 18 substitutes the pair of TA and DS into the equation (5) to calculate a coefficient according to the least square method. That is, the calculation unit 18 substitutes the coefficient found by the above-mentioned procedure into the equation (5) to acquire the equation indicating the relationship between TA and DS.

Then, the calculation unit 18 substitutes a plurality of DSs into the equation thus acquired to create a plurality of data sets of TA and DS, that is, the first interpolation table 301.

The number of data sets stored in the first base table 201 is three in this embodiment and however, any number of data sets may be stored in the first base table 201.

The number of data sets stored in the first interpolation table 301 is n1 in this embodiment and however, any number of data sets may be stored in the first interpolation table 301.

The DS values stored in the first interpolation table 301 are set such that a difference between consecutive DS values, for example, a difference between "0" and "32" or "32" and "64" in FIG. 12 is a power of 2. By setting the difference between consecutive DS values to a power of 2, the process P1 can be performed using an adder, a subtracter, a square root extractor, and a comparator. Further, significant figures of numerical values used in calculation can be made uniform. Consequently, the process P1 can be performed using a simple arithmetic circuit.

FIG. 13 is a graph illustrating the relationship between TS and DT, which is stored in the first interpolation table. In FIG. 13, n1 is 7.

A range 130 of DS is an input range of the AD converter 16.

The DS values in the first interpolation table 301 may be selected to include the range 130 of DS.

The process A may be performed by an external device other than the circuit 1.

The first correspondence may be generated by inputting information from the user of the circuit 1 in place of performing the process A.

Method of Generating Second Correspondence

Next, a method of generating the second correspondence will be described.

As described below, the second correspondence is information (table) indicating correspondence between TS and DT. Specific content of the second correspondence is a below-mentioned second base table 202 or second interpolation table 302. The second correspondence is generated by a second generation circuit not shown of the circuit 1. The second base table 202 and the second interpolation table 302 are generated through the process B. The process B is performed before start of the measurement flow. The second base table 202 and the second interpolation table 302 are stored in the storage unit 17 before start of the measurement flow.

Figure 14:
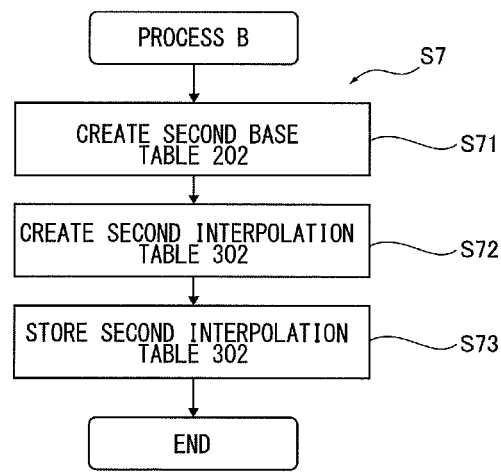
FIG. 14 is a flowchart illustrating a flow of a process B included in the preparation flow.

FIG. 14 is a schematic view illustrating a procedure of the method of generating the second correspondence in the circuit 1 (process B).

First, the circuit 1 creates the second base table 202 by a below-mentioned predetermined method (S71).

Subsequently, the circuit 1 creates the second interpolation table 302 according to a below-mentioned predetermined method (S72).

Subsequently, the circuit 1 stores the second interpolation table 302 in the storage unit 17 (S73).

Second Base Table

Next, the second base table will be described.

The second base table 202 is a table indicating the relationship between TS and DT, which is created by the calculation unit 18 in S71 of the process B. The second base table 202 stores a plurality of data sets in which TA, TS, DT, and DS are associated with one another.

Figures 15, 16:
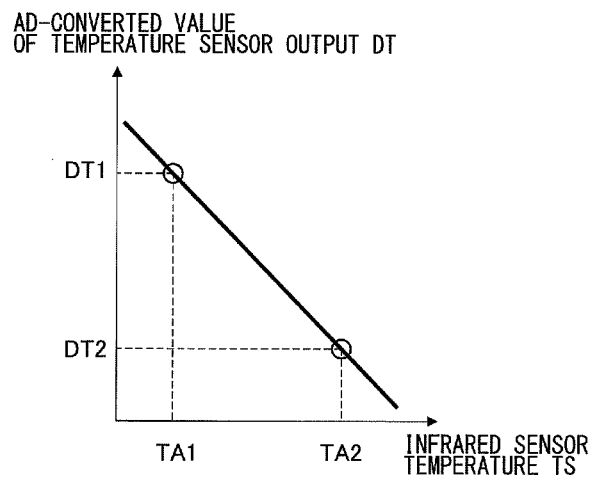
FIG. 15 is a schematic view illustrating an example of information stored in a second base table created in the flow of the process B.
FIG. 16 is a graph illustrating the relationship between the temperature of the infrared sensor and the output value of the AD converter in response to the input from the infrared sensor, which are stored in the second base table.

FIG. 15 is a schematic view illustrating an example of information stored in the second base table 202. The calculation unit 18 receives DT and DS acquired when the value of TA is artificially changed to TA1 and TA2 from the temperature sensor 12 and the infrared sensor 11, respectively. The calculation unit 18 associates the acquired values DT (DT1 and DT2) and DS (DS1 and DS2) with TA, and stores the values in the second base table 202.

Here, TA1 may be set to be equal to T1. When TA1 is T1, no error in DT occurs due to a difference between TA1 and T1, realizing the second base table 202 having a small temperature-induced error.

FIG. 16 is a graph illustrating the relationship between TS and DT, which is stored in the second base table 202. Here, since the two data sets are stored in the second base table 202, the number of points shown in FIG. 16 is two. The relationship between TS and DT is linear as shown in FIG. 6C.

Second Interpolation Table

Next, the second interpolation table will be described.

The second interpolation table 302 is a table that stores a plurality of data sets in which TS is associated with DT. Information stored in the second interpolation table 302 can be acquired by estimating the correspondence between TS and DT on the basis of values in the second base table 202, and performing predetermined calculations from the estimated correspondence.

Figures 17, 18:
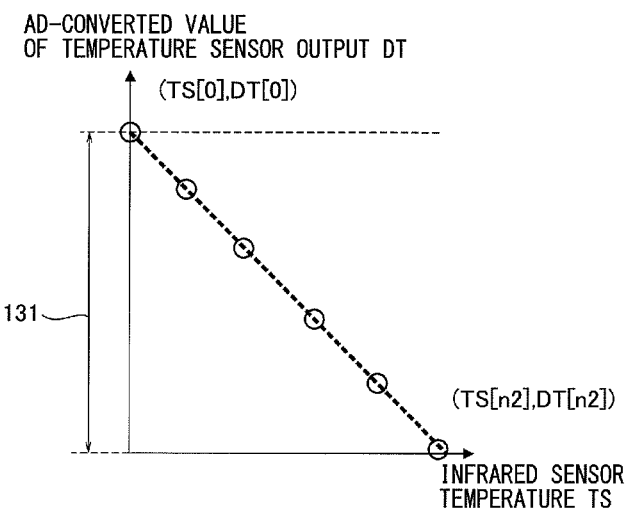
FIG. 17 is a schematic view illustrating an example of information stored in a second interpolation table created on the basis of the information stored in the second base table.
FIG. 18 is a graph illustrating relationship between the object temperature and the temperature of the infrared sensor and the output value of the AD converter in response to the input from the temperature sensor, which are stored in the second interpolation table.

FIG. 17 is a schematic view illustrating an example of information stored in the second interpolation table 302 created on the basis of the information stored in the second base table 202 in S72. The second interpolation table 302 stores column number k2, TS, and DT that are associated with one another. The number of data sets stored in the second interpolation table 302 is n2.

Here, a calculation method of creating the second interpolation table 302 from the second base table 202 will be described.

First, an equation indicating the relationship between TS and DT is created based on the second base table 202. Here, the pair of TS and DT stored in the second base table 202 satisfy the equation (5). Consequently, the calculation unit 18 solves simultaneous equations by substituting the pair of TS and DT into the equation (5) to calculate a coefficient Ca and a coefficient Cb. That is, the calculation unit 18 substitutes the coefficient Ca and the coefficient Cb into the equation (5) to calculate an equation indicating the relationship between TS and DT.

The calculation unit 18 substitutes a plurality of DT into the equation thus acquired, creating a plurality of pairs of TS and DT, that is, the second interpolation table 302.

The two data sets are stored in the second base table 202 in this embodiment and however, any number of data sets may be stored in the second base table 202.

The simultaneous equations are used to calculate the coefficient Ca and the coefficient Cb in this embodiment and however, the least square method may be used.

The number of data sets stored in the second interpolation table 302 is n2 in this embodiment and however, any number of data sets may be stored in the second interpolation table 302.

The DT values stored in the second interpolation table 302 are set such that a difference between consecutive DT values, for example, a difference between "1024" and "896" or "896" and "768" in FIG. 17 is a power of 2. By setting the difference between consecutive DT values to a power of 2, the process Q1 can be performed using an adder, a subtracter, a square root extractor, and a comparator. Further, significant figures of numerical values used in calculation can be made uniform. Consequently, the process Q1 can be performed using a simple arithmetic circuit.

FIG. 18 is a graph indicating the relationship between TS and DT, which is stored in the second interpolation table 302. In FIG. 18, n2 is 5.

A range 131 of DT is an input range of the AD converter 16.

The DT values in the second interpolation table 302 may be selected to include the range 131 of DT.

The process B may be performed by an external device other than the circuit 1.

The second correspondence may be generated by inputting information from the user of the circuit 1 in place of performing the process B.

Measurement Flow

Next, the measurement flow will be described.

Figure 19:
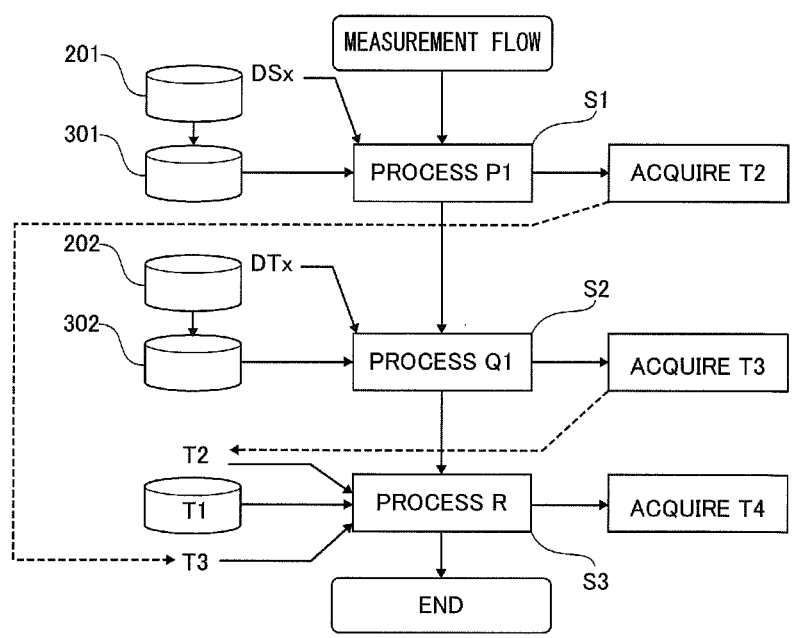
FIG. 19 is a flowchart illustrating the measurement flow performed by the semiconductor integrated circuit.

FIG. 19 is a flowchart illustrating the measurement flow performed by the calculation unit 18.

First, the calculation unit 18 reads a value acquired on the basis of the output value of the infrared sensor 11 (hereinafter, also referred to as "DSx") from the storage unit 17 to perform the process P1 (S1). Here, DSx is a value acquired by AD-converting the output value of the infrared sensor 11 by using the AD converter 16. The calculation unit 18 calculates T2 through the process P1, and stores T2 in the storage unit 17.

Subsequently, the calculation unit 18 reads a value acquired on the basis of the output value of the temperature sensor 12 (hereinafter, also referred to as "DTx") from the storage unit 17 to perform the process Q1 (S2). Here, DTx is a value acquired by AD-converting the output value of the temperature sensor 12 by using the AD converter 16. The calculation unit 18 calculates T3 through the process Q1, and stores T3 in the storage unit 17.

Subsequently, the calculation unit 18 performs the process R by using T1, T2, and T3 stored in the storage unit 17 (S3). The calculation unit 18 calculates T4 through the process R, and sends T4 to the interface unit 19.

The process Q1 may be performed before performing the process P1 rather than after performing the process P1.

Process P1

The process P1 is a process of calculating TA corresponding to DSx, that is, T2 according to the first interpolation table 301.

Figure 20:
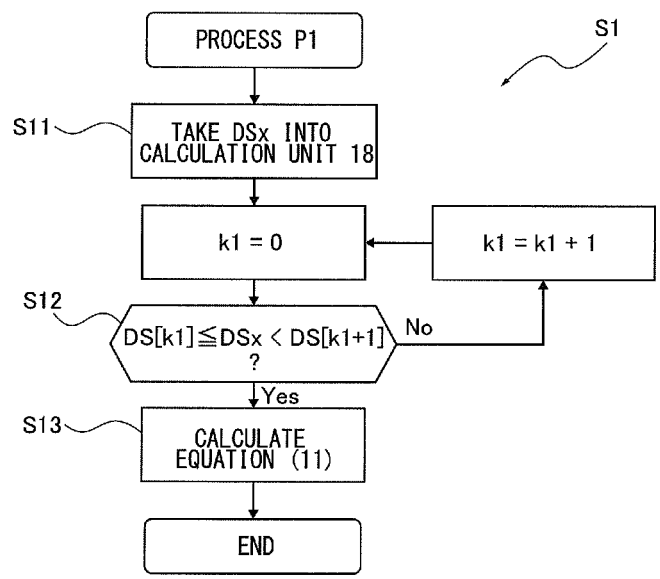
FIG. 20 is a flowchart illustrating a flow of a process P1 included in the measurement flow shown in FIG. 19.

FIG. 20 is a flowchart illustrating the measurement flow performed by the calculation unit 18 in the process P1.

First, the calculation unit 18 reads DSx from the storage unit 17 (S11).

Subsequently, the calculation unit 18 searches previous and next values of DSx among the DS values stored in the first interpolation table 301. That is, the calculation unit 18 searches k1 in which a k1$^{th}$ value among the DS values in the first interpolation table 301 and DSx satisfy the following equation (10).

$$DS[k1] \leq DSx < DS[k1+1] \qquad (10)$$

Subsequently, an equation (11) is calculated using k1 found by the search.

$$T2 = TA[k1+1] + \frac{(DS - DS[k1+1])(TA[k1+1] - TA[k1])}{DS[k1+1] - DS[k1]} \qquad (11)$$

Here, TA[k1] refers to a k1$^{th}$ value among the TA values stored in the first interpolation table 301.

Figure 21A:
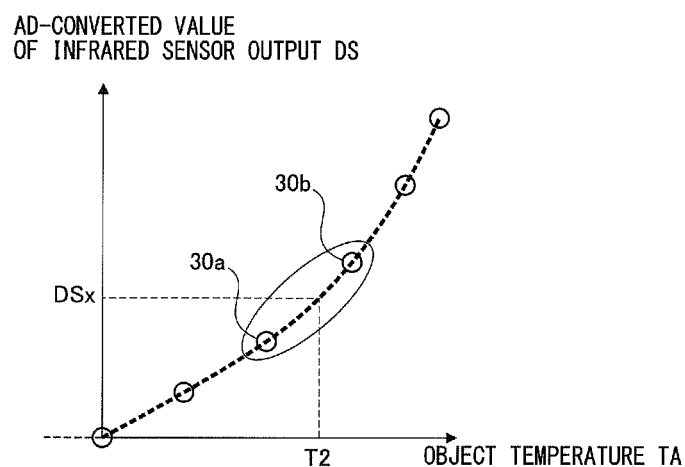
FIG. 21A to FIG. 21B are schematic views illustrating an example of a procedure of calculating the second temperature from the output value of the AD converter in response to the input from the infrared sensor according to information in the first interpolation table in FIG. 19.
Figure 21B:
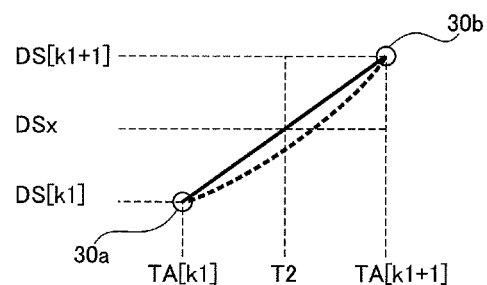

FIG. 21A to FIG. 21B are schematic views illustrating a procedure of calculating T2 from DSx in S12. FIG. 21A illustrates search of two previous and next points of DSx among the DS values stored in the first interpolation table 301, which indicate correspondence between DS and TA. FIG. 21A illustrates that DSx is a value between $k1^{th}$ DS[k1] and $k1+1^{th}$ DS[k1+1]. Then, $k1^{th}$ TA[k1] corresponding to $k1^{th}$ DS and $k1+1^{th}$ TA[k1+1] corresponding to $k1+1^{th}$ DS are acquired from the first interpolation table 301.

FIG. 21B is a schematic view illustrating calculation of the equation (11), that is, calculation to determine T2 by linearly interpolating a point 30a and a point 30b acquired from the first interpolation table 301. The calculation unit 18 calculates TA corresponding to an intersection of the interpolation line and DSx as T2. By previously storing the first interpolation table 301 in the storage unit 17, the measurement flow can calculate T2 by simple calculation without using complicated simultaneous equations and least square method.

To calculate T2 from DSx in S12, one neighboring value among the DS values stored in the first interpolation table 301 may be selected, and TA corresponding to the selected value may be determined as T2. Selecting one neighboring value can be reduce computational complexity in the measurement flow than the search of the previous and next values of DT.

Process Q1

The process Q1 is a process of calculating TS corresponding to DTx, that is, T3 according to the second interpolation table 302.

Figure 22:
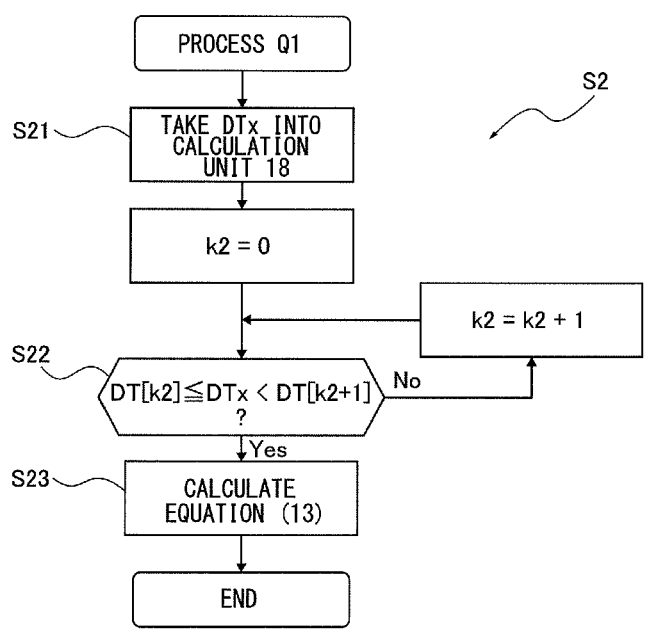
FIG. 22 is a flowchart illustrating a flow of a process Q1 included in the measurement flow in FIG. 19.

FIG. 22 is a flowchart illustrating a flow of the process Q1 performed by the calculation unit 18.

First, the calculation unit 18 reads DTx from the storage unit 17 (S21).

Subsequently, the calculation unit 18 searches previous and next values of DTx among the DT values stored in the second interpolation table 302. That is, the calculation unit 18 searches k2 in which a $k2^{th}$ value among the DT values in the second interpolation table 302 and DTx satisfy the following equation (12).

$$DT[k2] \leq DTx < DT[k2+1] \quad (12)$$

Subsequently, the calculation unit 18 calculates an equation (13) using k2 found by the search.

$$T3 = TS[k2+1] + \frac{(DT - DT[k2+1])(TS[k2+1] - TS[k2])}{ST[k2+1] - DT[k2]} \quad (13)$$

Here, TS[k2] refers to a $k2^{th}$ value among the TS values stored in the second interpolation table 302.

Figure 23:
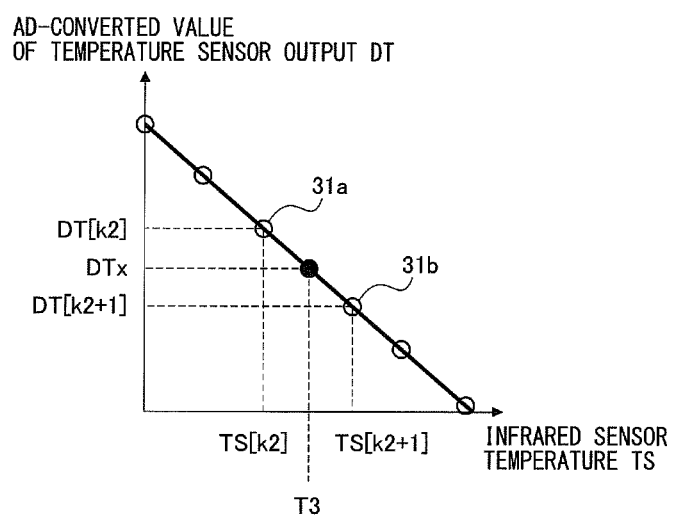
FIG. 23 is a schematic view illustrating an example of a procedure of calculating the third temperature from the output value of the AD converter in response to the input from the temperature sensor according to information in the second interpolation table.

FIG. 23 is a schematic view illustrating a procedure of calculating T3 from DTx in S22. In S22, two previous and next points of DTx among the DT values stored in the second interpolation table 302, which indicate correspondence between DT and TS, are searched. FIG. 23 illustrates that DTx is a value between $k2^{th}$ DT[k2] and $k2+1^{th}$ DT[k2+1]. Then, $k2^{th}$ TS[k2] corresponding to $k2^{th}$ DT and $k2+1^{th}$ TS[k2+1] corresponding to $k2+1^{th}$ DT are acquired from the second interpolation table 302.

A point 31a and a point 31b acquired from the second interpolation table 302 are linearly interpolated, and TS corresponding to an intersection of the interpolation line and DTx is calculated as T3. By previously storing the second interpolation table 302 in the storage unit 17, the measurement flow can calculate T3 by simple calculation without using complicated simultaneous equations and least square method.

To calculate T3 from DTx in S22, one neighboring value among the DT values stored in the second interpolation table 302 may be selected, and TS corresponding to the selected value may be determined as T3. Selecting one neighboring value can be reduce computational complexity in the measurement flow than the search of the previous and next values of DT.

Process R

The process R is a process of calculating T4 according to the equation (9) using T1, T2, and T3 stored in the storage unit 17.

Figure 24:
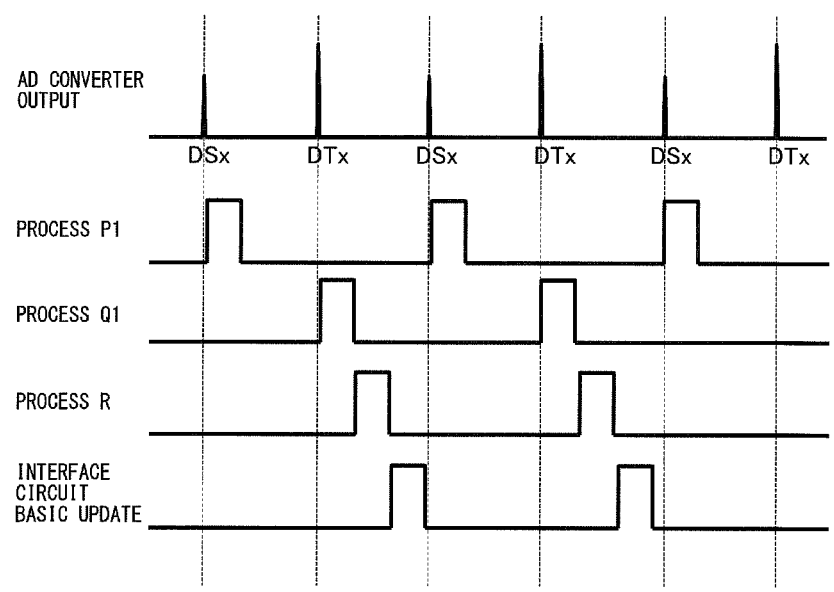
FIG. 24 is a timing chart illustrating relationship between each process included in the measurement flow and output of the semiconductor integrated circuit.

FIG. 24 is a timing chart illustrating relationship among output of the AD converter 16, the process P1, the process Q1, the process R, and output of the circuit 1.

First, the AD converter 16 outputs DTx and DSx at regular intervals through control via SW1 and SW2 in FIG. 3.

When the AD converter 16 outputs DSx, the process P is performed.

Subsequently, when the AD converter 16 outputs DTx, the process Q is performed. After the process Q, the process R is performed.

When the process R is performed, the value T4 calculated in the process R is outputted from the circuit 1.

In the embodiment, the circuit 1 can calculate T4 by simple calculation, that is, the equation (9) using the output value of the infrared sensor 11 and the temperature of the infrared sensor 11.

Semiconductor Integrated Circuit (2)

Next, a difference between another embodiment of the circuit and the above-mentioned embodiment will be mainly described. Here, this embodiment is different from the above-mentioned embodiment in that T2 is calculated without using the first interpolation table 301.

Figure 25:
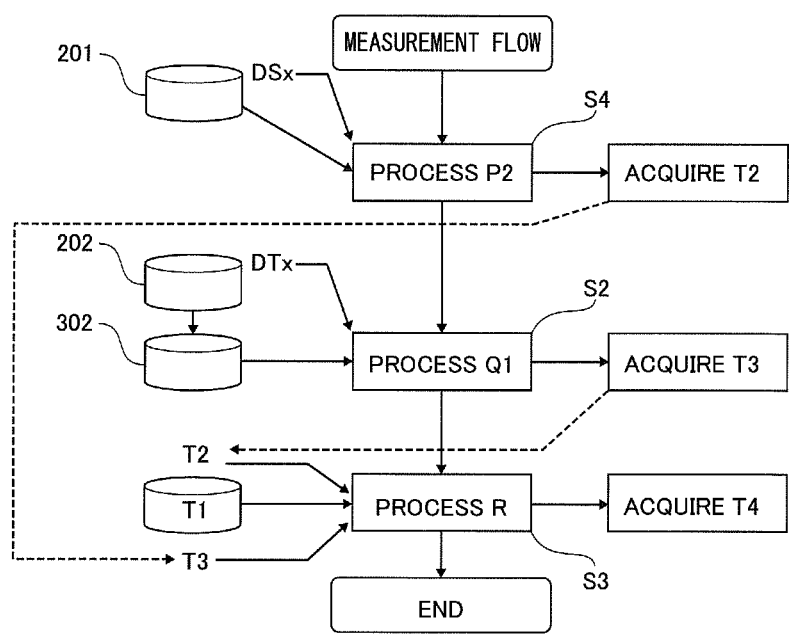
FIG. 25 is a flowchart illustrating another measurement flow performed by the semiconductor integrated circuit.

FIG. 25 is a flowchart illustrating a measurement flow in this embodiment. In this embodiment, a process P2 is performed in place of the process P1 performed in the above-mentioned embodiment (S4). After the process P2, as in the above-mentioned embodiment, the process Q1 and the process R are performed. The process R calculates T4.

Figure 26:
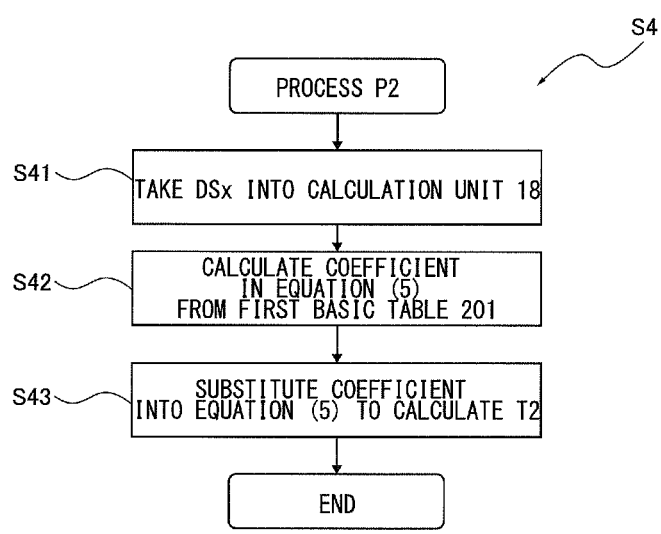
FIG. 26 is a flowchart illustrating a flow of a process P2 included in the measurement flow in FIG. 25.

FIG. 26 is a flowchart illustrating the measurement flow of the process P2 performed by the calculation unit 18.

First, the calculation unit 18 reads DSx (S41).

Subsequently, the calculation unit 18 calculates a coefficient in the equation (4) according to the least square method (S42). Here, the pair of TA and DS stored in the first base table 201 satisfy the equation (4). Consequently, the data set in the first base table 201 can be substituted into the equation (4), calculating the coefficient in the equation (4).

Subsequently, the calculation unit 18 substitutes the found coefficient and DSx into the equation (4) to calculate TA corresponding to DSx, that is, T2 (S43).

In the embodiment, the circuit 1 eliminates the need for creating the first interpolation table 301 and searching DTx in the first interpolation table 301, reducing computational complexity in the measurement flow.

Semiconductor Integrated Circuit (3)

Next, a difference between another embodiment of the circuit and the above-mentioned embodiments will be mainly described. Here, this embodiment is different from the above-mentioned embodiments in that T3 is calculated without using the second interpolation table.

Figure 27:
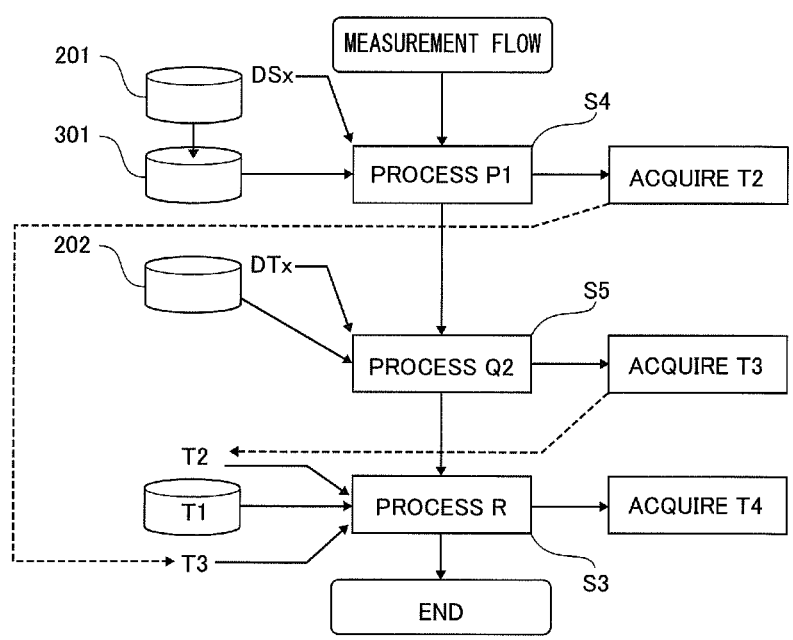
FIG. 27 is a flowchart illustrating still another measurement flow performed by the semiconductor integrated circuit.

FIG. 27 is a flowchart illustrating the measurement flow in this embodiment. In this embodiment, a process Q2 is performed in place of the process Q1 performed in the above-mentioned embodiments (S5). After the process Q2, as in the above-mentioned embodiments, the process R is performed. The process R calculates T4.

Figure 28:
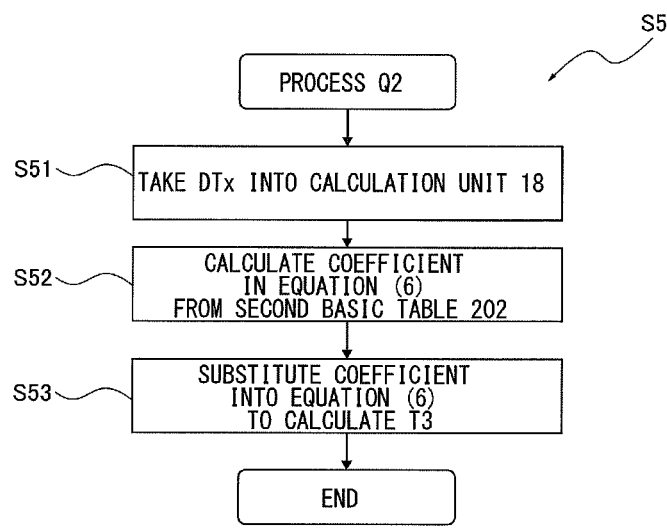
FIG. 28 is a flowchart illustrating a flow of a process Q2 included in the measurement flow in FIG. 27.

FIG. 28 is a flowchart illustrating the measurement flow of the process Q2 performed by the calculation unit 18.

First, the calculation unit 18 reads DTx from the storage unit 17 (S51).

Subsequently, the calculation unit 18 solves simultaneous equations to calculate coefficients Ca and Cb in the equation (6) (S52). Here, the pair of TS and DT in the second base table 202 satisfy the equation (6). Consequently, by substituting the data set in the second base table 202 into the equation (6), the coefficients in the equation (6) can be found.

Subsequently, the calculation unit 18 substitutes the found coefficient Ca and coefficient Cb, and DTx into the equation (6) to calculate TS corresponding to DTx, that is, T3 (S53).

In the embodiment, the circuit 1 eliminates the need for creating the second interpolation table 302 and searching DTx in the second interpolation table 302, reducing computational complexity in the measurement flow.

Four combinations of the process P1 and the process P2 that acquire T2 in the measurement flow, and the process Q1 and the process Q2 that acquire T3 are available. That is, any of the combinations of the process P1 and the process Q1, the process P1 and the process Q2, the process P2 and the process Q1, and the process P2 and the process Q2 may be used.

Semiconductor Integrated Circuit (4)

Next, differences between another embodiment of the circuit and the above-mentioned embodiments will be mainly described. Here, this embodiment is different from the above-mentioned embodiments in that the calculation unit of the circuit includes a correction circuit, and the correction circuit performs a process Y1 of correcting a drift included in DSx.

Zero Point Correction

Next, zero point correction will be described.

Zero point means DS at the time when TS is equal to TA. The accurate zero point is a constant value irrespective of TS.

The zero point correction is a process of estimating any shift of the zero point from the accurate value and correcting of the shift. The shift of the zero point is caused by input offset temperature of the amplifier 13 and input/output characteristics of the AD converter 16.

Figure 29:
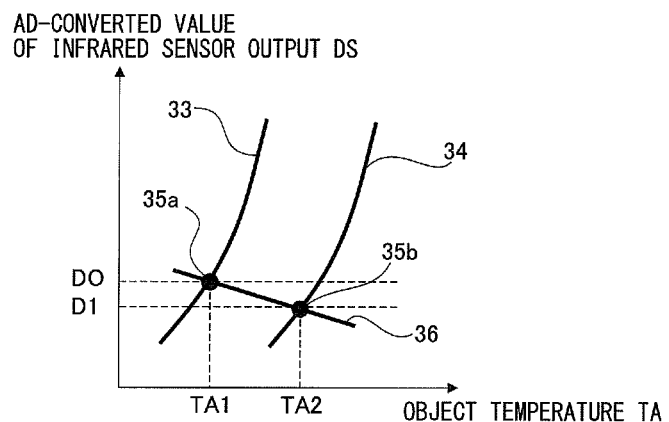
FIG. 29 is a schematic view illustrating relationship between the object temperature and the output value of the AD converter in response to the input from the infrared sensor, and the position of a zero point.

FIG. 29 is a graph illustrating the relationship between TA and DS and the position of the zero point. Here, a graph 33 shows the relationship between TA and DS at the time when TS is TA1. In the graph 33, the zero point is a DS value corresponding to a point 35a at the time when TA is TA1, that is, D0. A graph 34 shows the relationship between TA and DS at the time when TS is TA2. In the graph 34, the zero point is a DS value corresponding to a point 35b at the time when TA is TA2, that is, D1. The accurate zero point is a constant value irrespective of TS as described above. Accordingly, a difference between the zero point D0 in the graph 33 and the zero point D1 in the graph 34 represents a shift of the zero point.

Here, the zero point decreases depending on TS. That is, a line 36 connecting the point 35a to the point 35b slopes to the right.

Figure 30:
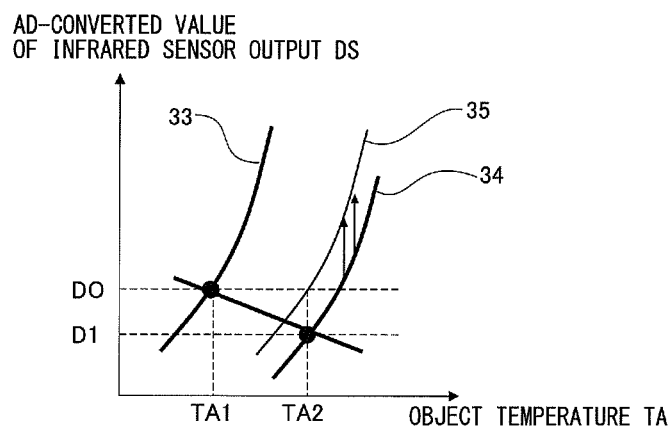
FIG. 30 is a graph illustrating relationship between the object temperature and the output value of the AD converter in response to the input from the infrared sensor.

FIG. 30 is a schematic view illustrating the state where the graph 34 is moved by zero point correction. The zero point in the graph 34 is moved from D1 to D0 by zero point correction. That is, the graph 34 is moved to the graph 35.

Figure 31:
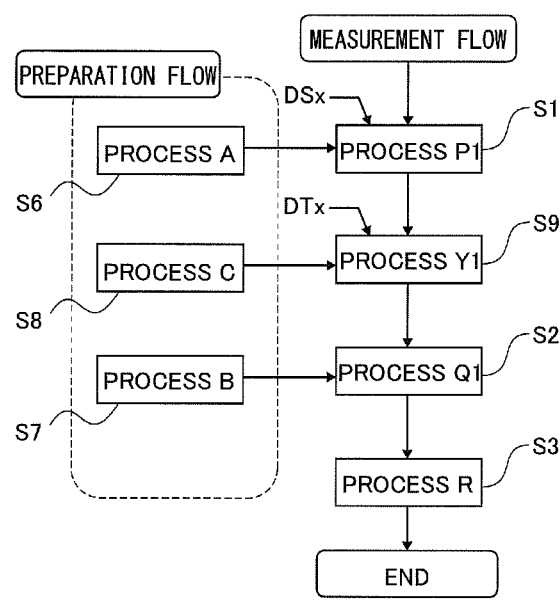
FIG. 31 is a schematic view illustrating another relationship between the measurement flow and the preparation flow that are performed by the semiconductor integrated circuit.

FIG. 31 illustrates an example of the measurement flow and the preparation flow in the case where zero point correction is performed in the measurement flow. The process Y1 is one process in the measurement flow. The process Y1 is performed before the process Q1. A process C is a flow of creating a third interpolation table 303 used in the process Y1.

Method of Creating Third Correspondence

Next, a method of creating a third correspondence will be described.

The third correspondence refers to information (table) indicating correspondence between TS and a zero point correction amount (hereinafter, also referred to as "E"). Here, E is a necessary movement of the zero point, which corresponding to shift, that is, a difference between D1 and D0 in FIG. 30. The third correspondence is generated by a third generation circuit not shown of the circuit 1. Specific content of the third correspondence is a below-mentioned third base table 203 or third interpolation table 303. The third base table 203 and the third interpolation table 303 are generated through the process C. The process C is performed before start of the measurement flow. The third base table 203 and the third interpolation table 303 are stored in the storage unit 17 before start of the measurement flow.

Figure 32:
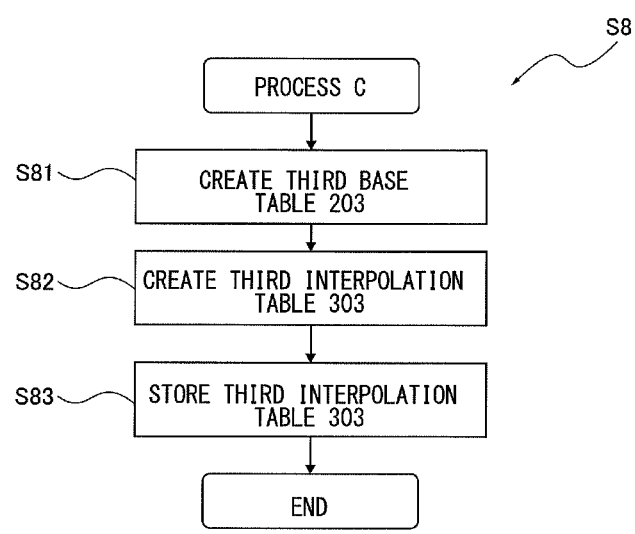
FIG. 32 is a flowchart illustrating a flow of generating a third interpolation table used in a process Y1 included in the preparation flow in FIG. 31.

FIG. 32 is a schematic view of a procedure of the method of generating the third correspondence in the circuit 1 (process C).

First, the circuit 1 creates the third base table 203 according to a below-mentioned predetermined method (S81).

Subsequently, the circuit 1 creates the third interpolation table 303 according to a below-mentioned predetermined method (S82).

Subsequently, the circuit 1 stores the third interpolation table 303 in the storage unit 17 (S83).

Third Base Table

Next, the third base table 203 will be described.

The third base table 203 is a table indicating the relationship between TS and E, which is created in S81 of the process C by the calculation unit 18. The third base table 203 stores a plurality of data sets in which TA, TS, DT, and DS are associated with one another.

Figure 33:
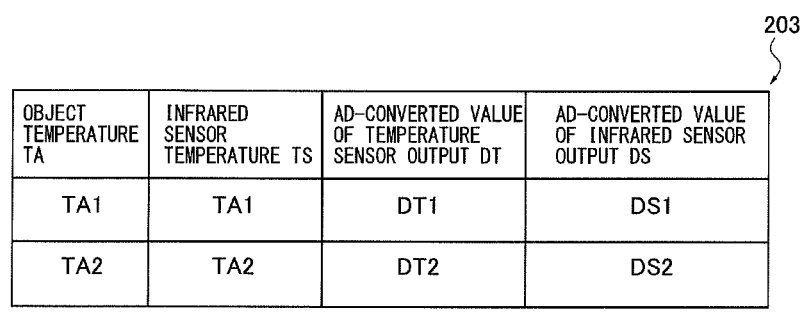
FIG. 33 is a schematic view illustrating an example of information stored in a third base table created in the flow of generating the third interpolation table.

FIG. 33 is a schematic view illustrating an example of information in the third base table 203. In FIG. 33, TA, TS, DT, and DS are associated with one another and stored. The calculation unit 18 measures DT and DS acquired when a value of TS is artificially changed to TA1 and TA2, and associates the acquired values DT1, DT2, DS1, and DS2 with TS and stores them in the third base table 203.

Here, E can be found using DS1 and DS2. That is, using DS at TA1 as a reference, E at DS1 becomes 0. Consequently, E at DS2 is D1-D0.

TA1 may be set to be equal to T1. Since T1 is the reference temperature, by setting TA1 and T1 to be equal to each other, the reference of the zero point can be ensured, achieving accurate zero point correction.

The third base table 203 may use information in the second base table 202. Using the information in the second base table 202 in the third base table 203 can reduce computational complexity as compared to the case of creating the third base table 203 separately from the second base table 202.

Third Interpolation Table

Next, the third interpolation table 303 will be described.

The third interpolation table 303 is a table that stores a plurality of data sets in which TS is associated with E. The third interpolation table 303 can be acquired by estimating correspondence between TS and E on the basis of the values in the third base table 203, and performing predetermined calculations using the estimated correspondence.

Figure 34:
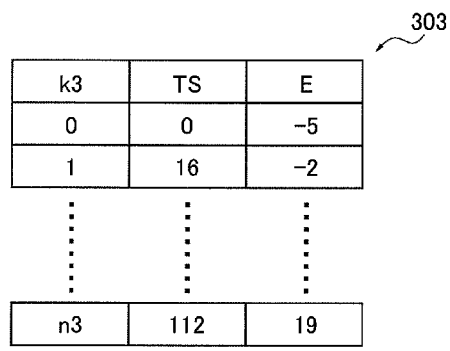
FIG. 34 is a schematic view illustrating an example of information stored in the third interpolation table created on the basis of the information stored in the third base table.

FIG. 34 is a schematic view illustrating an example of information stored in the third interpolation table 303 created based on the information stored in the third base table 203 in S82. The third interpolation table 303 stores column number k3, TS, and E that are associated with one another. The number of data sets stored in the third interpolation table 303 is n3.

Here, a method of creating the third interpolation table 303 from the third base table 203 will be described.

First, an equation indicating the relationship between TS and E is created on the basis of the third base table 203. Here, the pair of TS and E stored in the third base table 203 satisfy linear function. Consequently, the calculation unit 18 solves simultaneous equations by substituting the pair of TS and E into the linear equation to calculate a coefficient. That is, the calculation unit 18 acquires the equation indicating the relationship between TS and E according to the above-mentioned calculation.

Then, the calculation unit 18 substitutes a plurality of TS values into the equation thus acquired to create a plurality of data sets of TS and DT, that is, the third interpolation table 303.

The number of data sets stored in the third base table 203 in this embodiment is two and however, any number of data sets may be stored in the third base table 203.

The number of data sets stored in the third interpolation table 303 in this embodiment is n3 and however, any number of data sets may be stored in the third interpolation table 303.

In this embodiment, the pair of TS and E satisfy linear function and however, may satisfy quadratic function. Using high-order function can accurately calculate E.

The TS values stored in the third interpolation table 303 are set such that a difference between consecutive TS values, for example, a difference between "0" and "16" in FIG. 34 is a power of 2. By setting the difference between consecutive TS values to a power of 2, the process Y1 can be performed using an adder, a subtracter, a square root extractor, and a comparator. Further, significant figures of numerical values used in calculation can be made uniform. Consequently, the process Y1 can be performed using a simple arithmetic circuit.

The TS values stored in the third interpolation table 303 may be set to include a measurable temperature range. For example, in the TS range in FIG. 34, a lower limit is set to 0° C. and an upper limit is set to 112° C.

The process C may be performed by an external device other than the circuit 1.

The third correspondence may be generated by inputting of information from the user of the circuit 1 without using the procedure.

Figure 35:
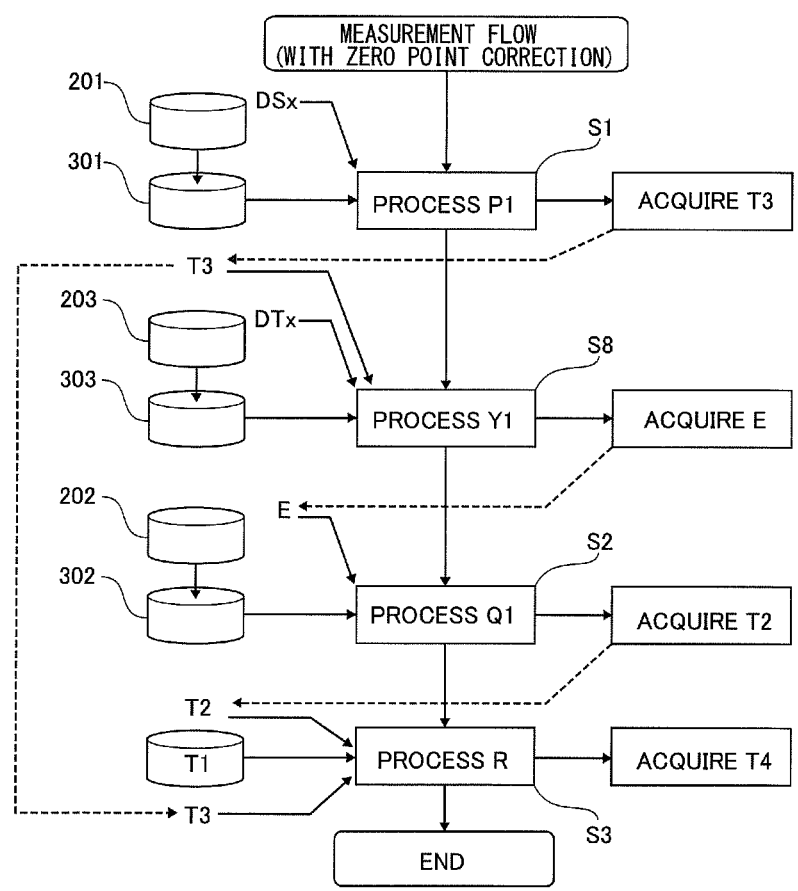
FIG. 35 is a schematic view illustrating still another relationship between the measurement flow and the preparation flow that are performed by the semiconductor integrated circuit.

FIG. 35 is a flowchart illustrating the measurement flow performed by the calculation unit 18. Here, the process Y1 is performed before the process Q1. DTx is corrected by calculating E in the process Y1 and adding E to DTx. The process Q1 uses corrected DTx in place of uncorrected DTx.

Process Y1

The process Y1 is a process of calculating E corresponding to TS by using the third interpolation table 303.

Figure 36:
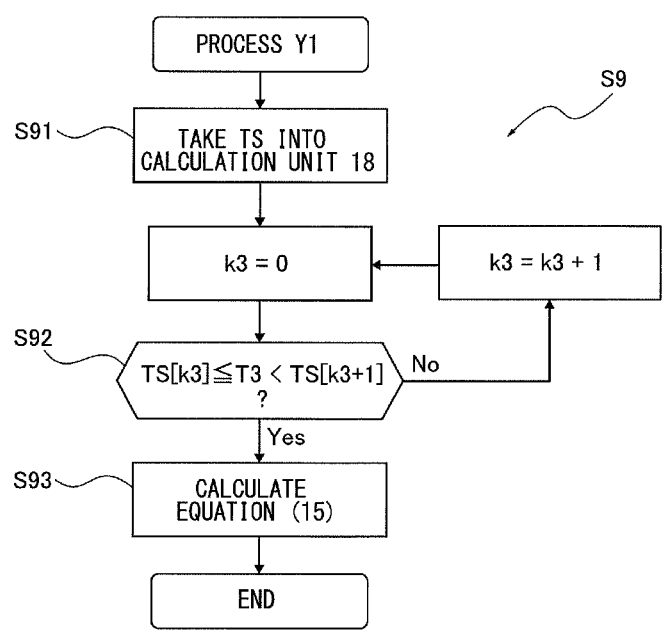
FIG. 36 is a flowchart illustrating a flow of the process Y1 included in the measurement flow in FIG. 35.

FIG. 36 is a flowchart illustrating the measurement flow of the process Y1 performed by the calculation unit 18.

First, the calculation unit 18 reads TS as a second reference value from the storage unit 17 (S91).

Subsequently, the calculation unit 18 searches previous and next values of the second reference value among the TS values stored in the third interpolation table 303. That is, the calculation unit 18 searches k1 in which a k3$^{th}$ value among the TS values in the third interpolation table 303 and TS satisfy the following equation (14).

$$TS[k3] \leq E < TS[k3+1] \tag{14}$$

Subsequently, the equation (15) is calculated using k3 found by the search.

$$E = E[k3+1] + \frac{(TS - TS[k3+1])(E[k3+1] - E[k3])}{TS[k3+1] - TS[k3]} \tag{15}$$

Here, TS[k3] refers to a k3$^{th}$ value among the TS values stored in the third interpolation table 303.

Figure 37A:
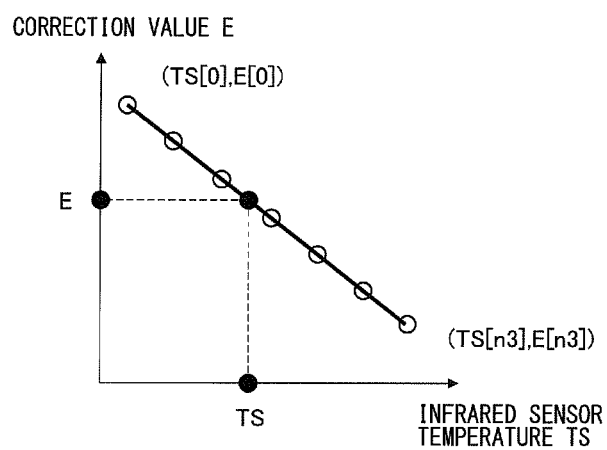
FIG. 37A to FIG. 37B are graphs illustrating an example of a procedure of calculating a correction value from the temperature of the infrared sensor by using information in the third interpolation table.
Figure 37B:
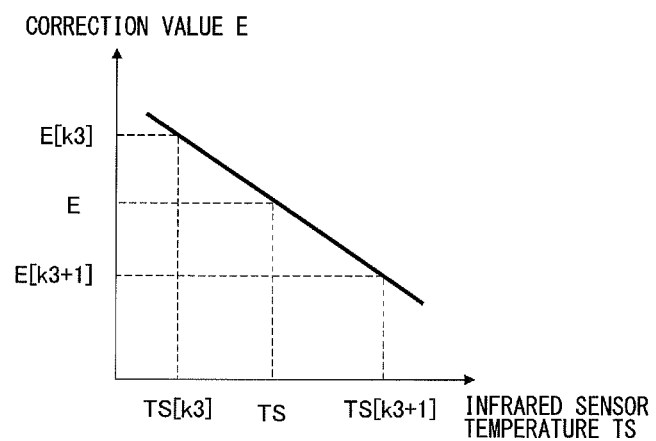

FIG. 37A to FIG. 37B are schematic views illustrating a procedure of calculating E from TS in S92.

FIG. 37A illustrates search of two previous and next points of TS among the TS values stored in the third interpolation table 303, which indicate correspondence between TS and E. Points on the graph represent data stored in the third interpolation table 303. Here, in FIG. 37A, n3 is 6.

FIG. 37B is a schematic view illustrating search of two previous and next points of TS among the TS values stored in the third interpolation table 303, which indicate correspondence between TS and E. FIG. 37B illustrates that TS is a value between k3$^{th}$ TS[k3] and k3+1$^{th}$ TS[k3+1]. Then, k3$^{th}$ E[k3] corresponding to k3$^{th}$ TS and k3+1$^{th}$ E[k3+1] corresponding to k3+1$^{th}$ TS are acquired from the third interpolation table 303. By previously storing the third interpolation table 303 in the storage unit 17, the measurement flow can calculate T3 by simple calculation without using complicated simultaneous equations and least square method.

To calculate E from TS in S92, one neighboring value among the TS values stored in the third interpolation table 303 may be selected, and TS corresponding to the selected value may be determined as E. Selecting one neighboring value can be reduce computational complexity in the measurement flow than the search of the previous and next values of TS.

In the embodiment, DTx can be subject to zero point correction and thus, the circuit can calculate T4 using an accurate value with shift of the zero point being corrected.

Semiconductor Integrated Circuit (5)

Next, a difference between another embodiment of the circuit and the above-mentioned embodiments will be mainly described. Here, this embodiment is different from the above-mentioned embodiments in that E is calculated without using the third interpolation table 303.

Figure 38:
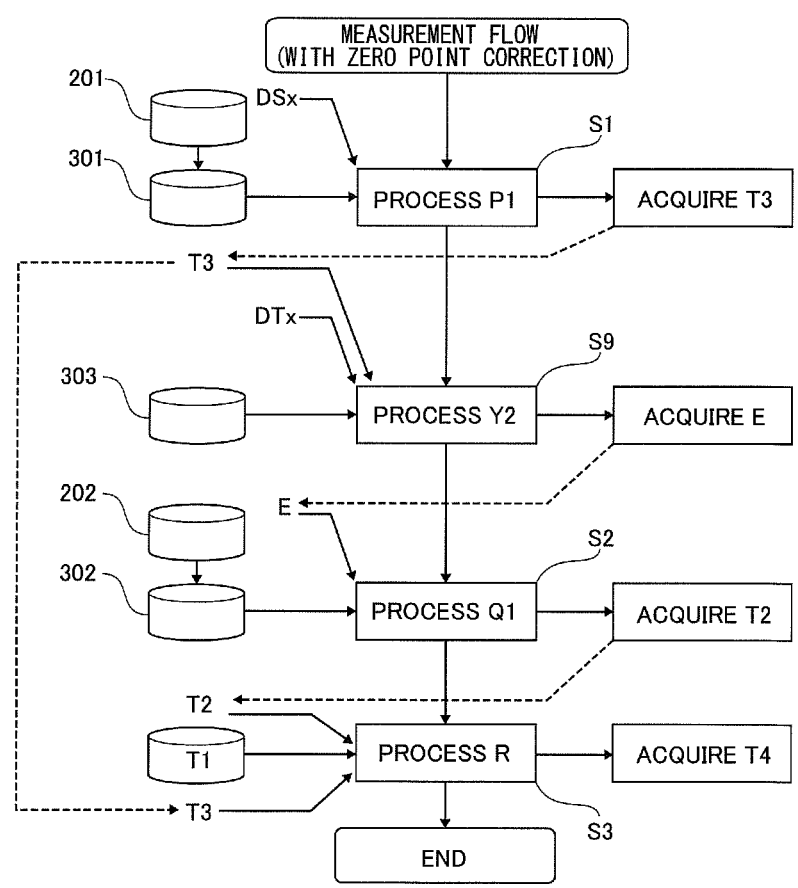
FIG. 38 is a flowchart illustrating the measurement flow performed by the semiconductor integrated circuit.

FIG. 38 is a flowchart illustrating the measurement flow in this embodiment. In this embodiment, a process Y2 is performed in place of the process Y1 performed in the above-mentioned embodiments. As in the above-mentioned embodiments, after the process Y2, the process Q1 and the process R are performed. Then, the process R calculates T4.

The calculation unit 18 solves simultaneous equations to calculate a coefficient of the linear function indicating the relationship between TS and E. Here, the pair of TS and E stored in the third base table 203 satisfy linear function. Consequently, the coefficient can be found by substituting the data set in the third base table 203 into the linear function.

Subsequently, the calculation unit 18 calculates E by substituting the found coefficient and TS into the linear function.

In the embodiment, the circuit eliminates the need for creating the third interpolation table 303 and searching TS in the third interpolation table 303, reducing computational complexity in the measurement flow.

What is claimed is:

1. A semiconductor integrated circuit comprising:
   an acquisition unit configured to acquire an output value outputted from an infrared sensor in response to an infrared ray received from an object, and an output value outputted from a temperature sensor as a function of measured temperature of the infrared sensor;
   a storage unit configured to store a first temperature which is a reference temperature and first correspondence information registering a correspondence relationship between a temperature of the object at time when the temperature of the infrared sensor is the first temperature, and the output value of the infrared sensor;
   a second-temperature identification circuit configured to determine, based on the first correspondence information, a second temperature which is the temperature of the object at the time when the temperature of the infrared sensor, which corresponds to a measured value which is the output value of the infrared sensor, acquired by the acquisition unit, is the first temperature;
   a third-temperature identification circuit configured to determine a third temperature which is the temperature of the infrared sensor at the time when the infrared sensor outputs the measured value; and
   a calculation circuit configured to calculate a fourth temperature, which is a temperature of the object calculated on the basis of the first temperature, the second temperature, and the third temperature.

2. The semiconductor integrated circuit according to claim 1,
   wherein the calculation circuit calculates the fourth temperature according to the following equation:

$$T4 = \sqrt[4]{T2^4 - T1^4 + T3^4},$$

where T1 is the first temperature, T2 is the second temperature, T3 is the third temperature, and T4 is the fourth temperature.

3. The semiconductor integrated circuit according to claim 1, further comprising:
   a generation circuit and a calculation unit configured to generate the first correspondence information; and
   a base table stored in the storage unit configured to register a plurality of combinations of the temperature of the object and the output value of the infrared sensor,
   wherein the generation circuit in combination with the calculation unit generates the first correspondence information based on the plurality of combinations stored in the base table.

4. The semiconductor integrated circuit according to claim 3, wherein the temperatures of the object stored in the base table include the first temperature.

5. The semiconductor integrated circuit according to claim 1, wherein the second-temperature identification circuit determines a temperature of the object corresponding to an output value of the infrared sensor that is a neighboring value, among plural output values of the infrared sensor stored in the storage unit, of the measured value, which is the output value of the infrared sensor acquired by the acquisition unit, using the first correspondence information, and determines the second temperature on the basis of the determined temperature of the object.

6. The semiconductor integrated circuit according to claim 1, wherein the second-temperature identification circuit determines a plurality of temperatures of the object corresponding to output values of the infrared sensor other than the measured value, which is the output value of the infrared sensor acquired by the acquisition unit, using the first correspondence information, and interpolates the plurality of temperatures using an interpolation table included in the storage unit to determine the second temperature.

7. The semiconductor integrated circuit according to claim 1, further comprising
   a base table stored in the storage unit configured to register combinations of the output value of the temperature sensor and the temperature of the infrared sensor,
   wherein the third-temperature identification circuit determines the third temperature corresponding to the output value of the temperature sensor, the output value of the temperature sensor being acquired from the acquisition unit, using the base table.

8. The semiconductor integrated circuit according to claim 1,
   wherein the first correspondence information stored in the storage unit comprises a plurality of output values of the infrared sensor, and
   a difference set by a calculation unit between two consecutive output values of the infrared sensor among the plurality of output values of the infrared sensor is a power of 2, the calculation unit including the second-temperature identification circuit, the third-temperature identification circuit, and the calculation circuit.

9. The semiconductor integrated circuit according to claim 1, further comprising:
   a second generation circuit and a calculation unit configured to generate second correspondence information,
   wherein the storage unit stores the second correspondence information indicating a correspondence relationship between temperature of the infrared sensor and the output value of the temperature sensor, and
   the third-temperature identification circuit determines the third temperature corresponding to the output value of the temperature sensor, the output value being acquired from the acquisition unit, using the second correspondence information.

10. The semiconductor integrated circuit according to claim 9, further comprising:
    a base table included in the storage unit configured to register a plurality of combinations of the output value of the temperature sensor and the temperature of the infrared sensor,
    wherein the second generation circuit and the calculation unit generates the second correspondence information using the plurality of combinations stored in the base table.

11. The semiconductor integrated circuit according to claim 10, wherein the temperatures of the infrared sensor in the base table include the first temperature.

12. The semiconductor integrated circuit according to claim 9,
    wherein the third-temperature identification circuit determines the temperature of the object corresponding to an output value of the infrared sensor that is a neighboring value among plural output values of the infrared sensor stored in the storage unit of a reference value which is the output value of the infrared sensor at the time when the temperature of the infrared sensor is the first temperature, using the second correspondence information, and determines the third temperature on the basis of the determined temperature of the object.

13. The semiconductor integrated circuit according to claim 9,
wherein the third-temperature identification circuit determines a plurality of temperatures of the object corresponding to output values of the infrared sensor other than a reference value which is the output value of the infrared sensor at the time when the temperature of the infrared sensor is the first temperature, using the second correspondence information, and interpolates the plurality of temperatures using an interpolation table included in the storage unit to determine the third temperature.

14. The semiconductor integrated circuit according to claim 9,
wherein the second correspondence information stores a plurality of output values of the temperature sensor, and
a difference set by a calculation unit between two consecutive output values of the temperature sensor among the plurality of output values of the temperature sensor is a power of 2, the calculation unit including the second-temperature identification circuit, the third-temperature identification circuit, and the calculation circuit.

15. The semiconductor integrated circuit according to claim 1, further comprising:
a correction circuit included in a calculation unit configured to correct the output value of the infrared sensor, the calculation unit including the second-temperature identification circuit, the third-temperature identification circuit, and the calculation circuit; and
a third generation circuit and a calculation unit configured to generate third correspondence information,
wherein the storage unit stores the third correspondence information indicating a correspondence relationship between the temperature of the infrared sensor and a correction amount of the output value of the infrared sensor, and
the correction circuit determines the temperature of the infrared sensor, the temperature corresponding to the output value of the temperature sensor, which is acquired by the acquisition unit, determines the correction amount corresponding to the determined temperature of the infrared sensor using the third correspondence information, and corrects the output value of the infrared sensor, which is acquired by the acquisition unit, with the determined correction amount.

16. The semiconductor integrated circuit according to claim 15, further comprising:
a base table included in the storage unit configured to register a plurality of combinations of the temperature of the object and the output value of the infrared sensor,
wherein the third generation circuit and the calculation unit generates the third correspondence information using the plurality of combinations stored in the base table.

17. The semiconductor integrated circuit according to claim 16, wherein the temperatures of the object stored in the base table include the first temperature.

18. The semiconductor integrated circuit according to claim 15,
wherein the correction circuit determines a correction amount of the output value of the infrared sensor, the correction amount corresponding to a temperature of the infrared sensor that is a neighboring value among the output values of the infrared sensor stored in the storage unit to a second reference value which is temperature of the infrared sensor, the temperature corresponding to the output value of the temperature sensor, which is acquired from the acquisition unit using the third correspondence information.

19. The semiconductor integrated circuit according to claim 15,
wherein the correction circuit determines correction amounts of a plurality of output values of the infrared sensor, the output values corresponding to temperatures other than a second reference value which is temperature of the infrared sensor, the temperature corresponding to the output value of the temperature sensor, which is acquired from the acquisition unit, using the third correspondence information, and interpolates the plurality of determined correction amounts using an interpolation table included in the storage unit to determine the correction amount of the output value of the infrared sensor, the output value being acquired by the acquisition unit.

20. The semiconductor integrated circuit according to claim 15,
wherein the third correspondence information includes a plurality of temperatures of the infrared sensor, and
a difference set by a calculation unit between two consecutive temperatures of the infrared sensor among the plurality of temperatures of the infrared sensor is a power of 2, the calculation unit including the second-temperature identification circuit, the third-temperature identification circuit, and the calculation circuit.

* * * * *